June 30, 1970     R. C. KRUSE     3,517,627
RADIATION PROTECTIVE WALL CONSTRUCTION AND
CLAD FURRING STRIPS THEREFOR
Filed Dec. 13, 1967     3 Sheets-Sheet 2
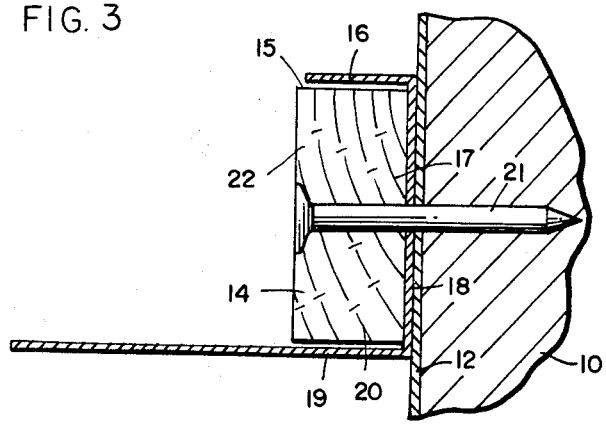
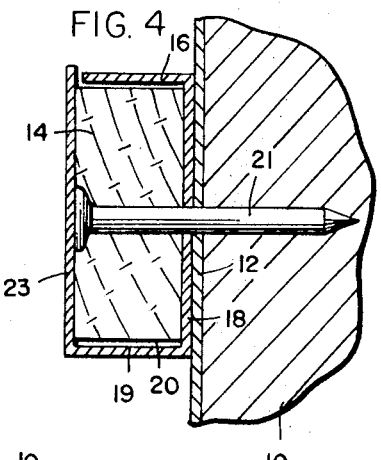
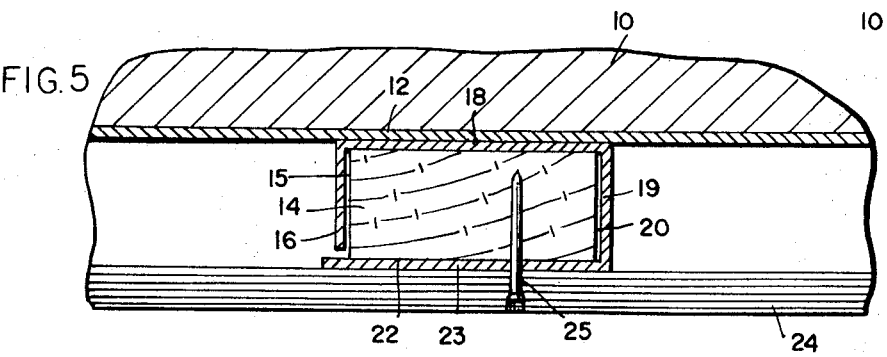
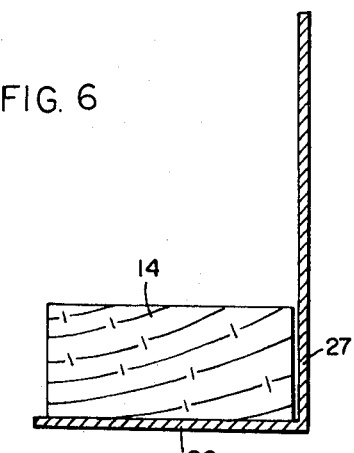
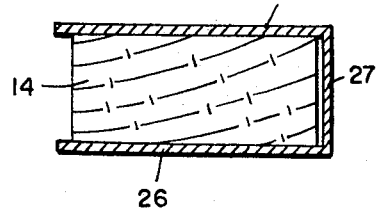
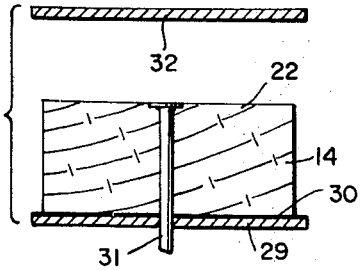
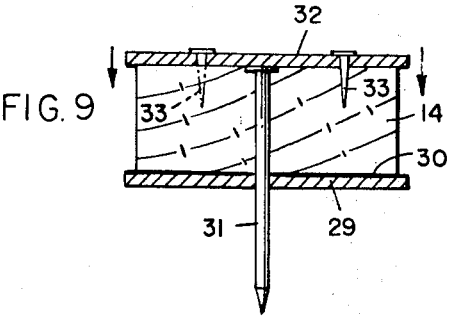
INVENTOR
ROBERT C. KRUSE
BY Marzall, Johnston, Cook & Root
ATT'YS June 30, 1970

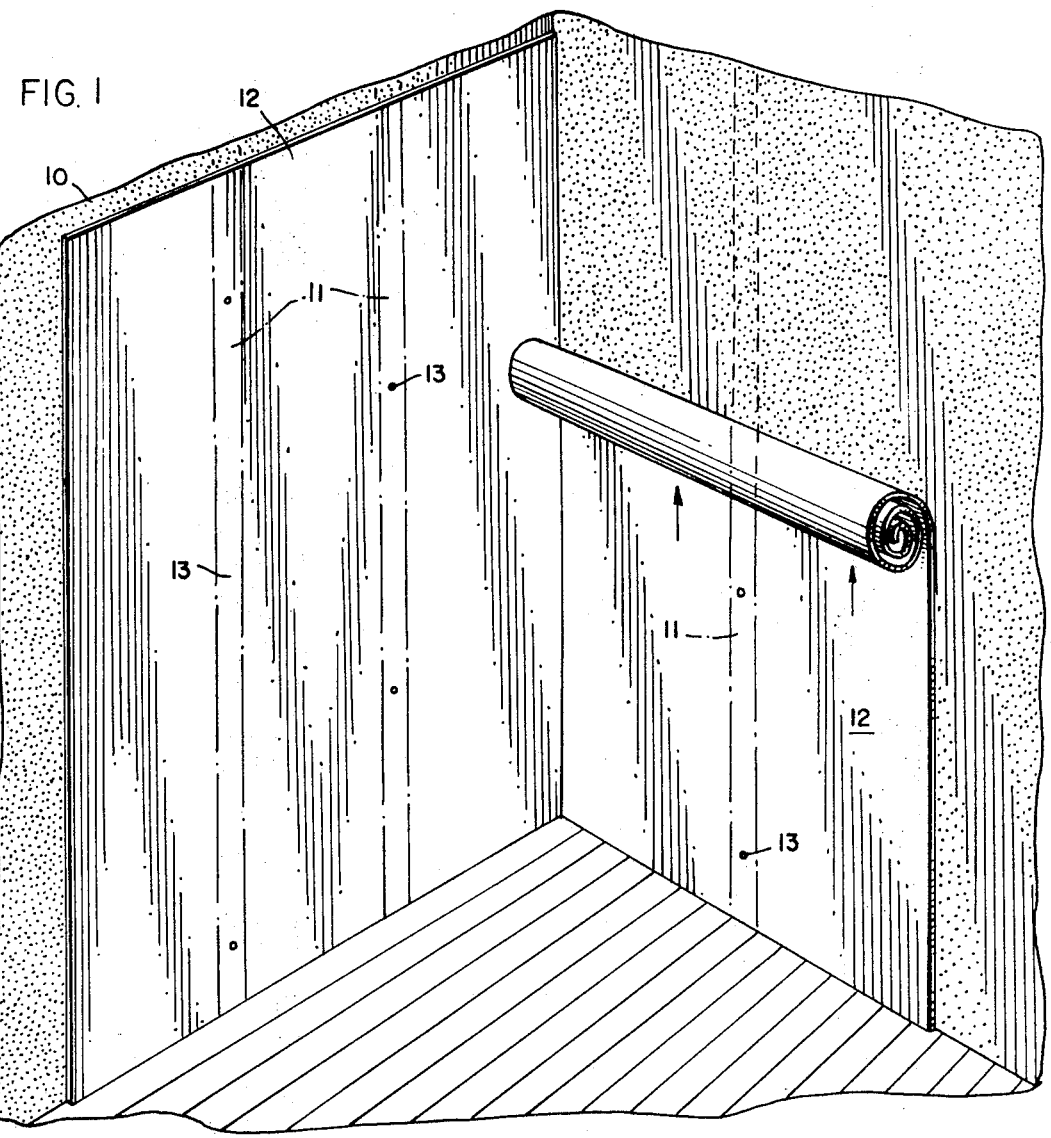
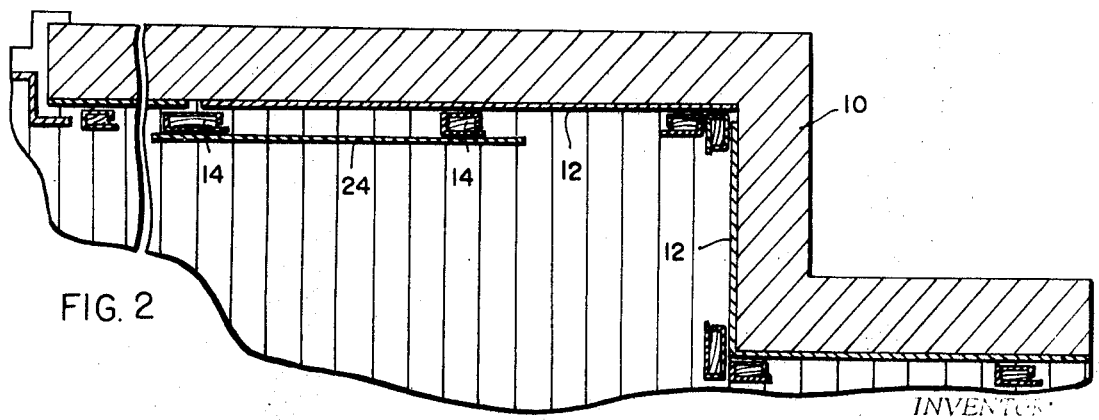

R. C. KRUSE 3,517,627

RADIATION PROTECTIVE WALL CONSTRUCTION AND
CLAD FURRING STRIPS THEREFOR

Filed Dec. 13, 1967

INVENTOR:
ROBERT C. KRUSE
BY
Marzall, Johnston, Cook & Root
ATT'YS

United States Patent Office 3,517,627
Patented June 30, 1970

3,517,627
RADIATION PROTECTIVE WALL CONSTRUCTION AND CLAD FURRING STRIPS THEREFOR
Robert C. Kruse, Broadview, Ill., assignor to Gertrude H. Tucci, doing business as Poersch Metal Manufacturing Company, Chicago, Ill.
Filed Dec. 13, 1967, Ser. No. 697,258
Int. Cl. G21f 1/08, 7/00
U.S. Cl. 109—82
10 Claims

ABSTRACT OF THE DISCLOSURE

A radiation-protective wall construction and clad furring strip therefor which permits the application of conventional wall coverings such as plaster board, ceramic tile, and the like, thereto without impairing the radiation-protective character thereof. Each clad furring strip is covered on the appropriate side or sides thereof with a layer of radiation-protective material and is secured to a wall lined with a layer of such radiation-protective material. Suitable fasteners, such as masonry nails, toggle bolts or common nails, are to be driven through the clad or unclad furring strip and into the wall, and such fasteners are then covered by the outer layer of radiation-protective material. Suitable fasteners such as brads, nails, screws or mastic, are also to be used to secure conventional wall covering to the clad furring strips. These fasteners do not penetrate the inner layer or lining of the radiation-protective material and thus the radiation-shielding character of the lining is not impaired.

BRIEF DESCRIPTION OF THE INVENTION

The invention resides in the provision of a clad furring strip to which conventional wall coverings may be secured and yet not impair the radiation-protective character of the completed wall construction. The term "radiation" as used herein is intended to embrace electromagnetic emanations, such as for example, X-rays, high-frequency radio waves, and the like.

It is known that lead is a common protective material for X-ray shielding and that rooms where X-rays are to be used are lined with lead in order to limit the passage of X-rays to a safe exposure level. In such installations, however, the lead sheeting or lining is bonded to the wall covering and commonly secured to the wall by means of lead-headed nails or other laborious methods.

The use of lead sheeting to line the walls of a room is not conductive to presenting a pleasant appearance. The present invention provides complete radiation shielding and at the same time permits the use of most varieties of finished wall covering.

For example, prefinished paneling, Marlite, plywood which may be painted, stained, papered or tiled, plaster lath for plastering, may all be used as they are usually secured to furring strips. In the case of this invention, by the addition of lead to the opposed sides or outer side of the furring strip, it permits finishing of radiation-shielded walls in a conventional manner without impairing their decorative appearance.

It is also known that copper wire mesh is used, for example, in hospitals for the control of high-frequency radio waves. Thus, in an area where such radiations are to be controlled, copper wire mesh is the radiation-protective material used.

Briefly described, a furring strip embodying the present invention is provided on opposed faces or outer face thereof with a strip of a radiation-protective material, i.e., lead in the case of X-rays, or copper wire mesh in the case of high-frequency radio waves. The radiation-protective material may be applied to the wall by the use of suitable fasteners extending through the protective material lining into the wall or studding. The furring strip is then applied over the lining or radiation-protective material, such as lead or copper wire mesh, or an optional inner layer of material between the furring strip and the lining. Suitable fasteners may then be driven through the furring strip, the lining, and into the wall or studding. The outer face of the furring strip is then provided with the opposed layer of radiation-protective material and secured thereto in any suitable manner, such as by the use of ordinary nails which are not long enough to extend through the strip and penetrate the inner layer or lining of material thereon.

Conventional wall covering may then be applied and secured to the furring strips, again by the use of suitable fasteners or mastic which may penetrate the outer layer of material thereon, but not the inner layer or lining. In this way the radiation-protective quality of the wall is not affected at any point.

In view of the foregoing, the principal object of the present invention is to provide a construction whereby a radiation-shield is adapted to the use of conventional wall covering without impairing the radiation-protective character thereof.

Another specific object of the invention is to provide a furring strip for use in constructing a radiation-protected wall wherein a layer of a radiation-protective material is located on one side of the furring strip, whereby the furring strip may be secured to the wall by driving fasteners through the furring strip and the inner layer and lining only, then securing the outer layer to the furring strip, after which a conventional wall covering may be secured to a plurality of the clad furring strips by a mastic, or by driving fasteners through the wall covering into the clad furring strip through the outer layer only.

Yet another specific object of the invention is to provide a clad furring strip for use in constructing a wall shielded against X-rays wherein a layer of lead is applied at least to the outer face thereof. The furring strip may be secured to a lead-covered wall by the use of suitable fasteners without impairing the protective quality thereof by first fastening the furring strip to the wall without the outer layer of lead thereon, then securing the outer layer of lead thereto by any suitable means, whereby a conventional wall covering may be mounted on a plurality of such strips by fastening to or through the wall covering and the outer layer of lead, but not through the inner layer, or lead wall lining.

Other objects and advantages of the invention will become apparent upon reading the following description taken in conjunction with the accompanying drawings, in which FIG. 1 is a fragmentary, perspective view of a corner of a room illustrating the application of a layer of a radiation-protective material thereto;

FIG. 2 is a fragmentary, horizontal, sectional view of a wall construction and a form of clad furring strips embodying the present invention;

FIG. 3 is an enlarged, horizontal, sectional view through a preferred form of a furring strip clad in a radiation-protective material at an intermediate stage thereof, and showing a manner of securing it to a wall;

FIG. 4 is a view similar to FIG. 3 but showing the furring strip completely clad in the radiation-protective material;

FIG. 5 is a view similar to FIG. 4 but showing also a conventional wall covering and, in this case, decorative paneling secured to the clad furring strip;

FIG. 6 is a modified form of a furring strip partially clad in a radiation-protective material at an intermediate stage thereof;

FIG. 7 is a view similar to FIG. 6 but showing the clad furring strip in its final form after it has been secured to a wall;

FIG. 8 is an exploded view of a further modified form of a clad furring strip;

FIG. 9 is a completed form of the clad furring strip of FIG. 8 showing the outer layer secured by conventional fasteners.

DETAILED DESCRIPTION

Figure 5B:
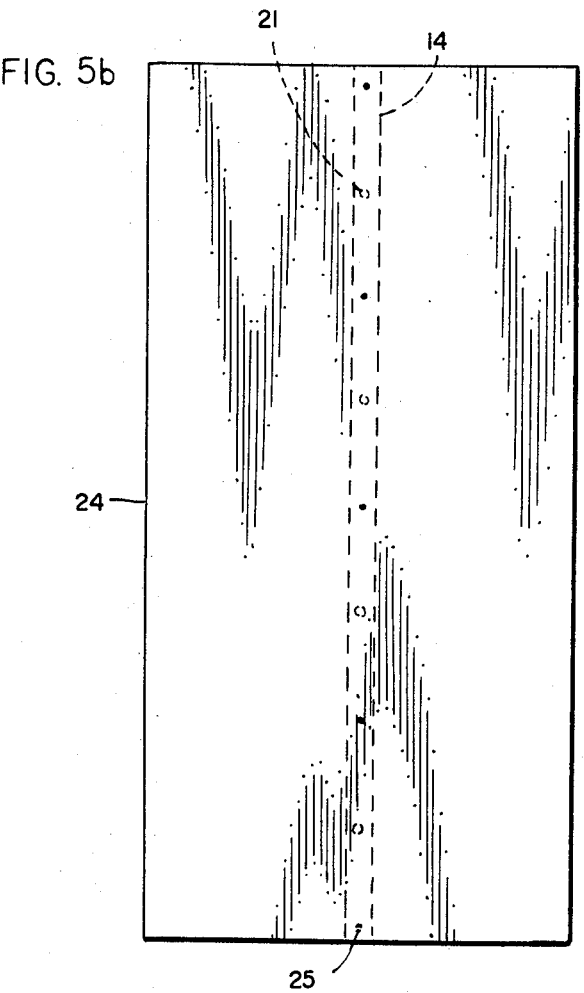
FIG. 5b is an elevational view of the construction shown in FIG. 5.

As mentioned hereinabove, the invention lies primarily in the construction of the clad furring strip which makes it possible to mount radiation-protective material to a wall and then finishing it with a conventional wall covering without impairing the protective characteristic thereof to the particular radiation. The invention is applicable to any form of radiation resulting from an electromagnetic emanation in connection with which there is some given material which attenuates the radiation. For example, lead is a barrier to X-rays, and copper wire mesh is a barrier to high-frequency radio waves.

Referring particularly to FIG. 1 of the drawings, the numeral 10 identifies a wall of any usual construction which may be concrete, wood studs, lath and plaster, or any other material from which a suitable wall can be made. In the case of a plaster wall, it is normally provided with a plurality of vertically extending and horizontally spaced studs 11. Such studs are normally spaced apart 16 or 18 inches.

It is common practice to line the walls of X-ray rooms, for example, with lead such as that shown by the numeral 12. The lead may be applied from a roll of any width. This lead sheeting is secured to the wall 10 by driving nails therethrough and into the wall or the studs 11, or may also be secured by other suitable fasteners. Prior to the advent of the present invention it had been common and necessary practice to use relatively expensive material and methods for this purpose.

One method has required bonding lead to the wall covering, which in itself is expensive and requires unusual, laborious fastening.

Another of these methods of fastening is with relatively costly lead-headed nails, which require counter boring for each nail, which limits the thickness and type of wall covering.

A further method of fastenng is with expensive and unsightly joiner strips.

Another method is with lead core blocks, which are expensive and require skilled, qualified tradesmen for installation.

The present invention permits the use of ordinary fasteners to secure the lead lining or sheeting 12 to the wall. As will presently be seen, this not only reduces the cost, but allows a decorative paneling to be secured to the wall, thereby improving the appearance thereof.

FIG. 2 illustrates a wall 10 which again may be of concrete or plaster, or other materials, and may or may not necessitate the use of studs. The radiation-protective material 12 is shown as in place on the existing wall by the use of ordinary fasteners such as those shown at 13 in FIG. 1, which may be a nail or other suitable fastener. By use of the present invention it is unnecessary to overlap the adjacent sheets of the radiation-protective material. In fact, overlapping of the edges of adjacent sheets is undesirable because it creates a vertical line of an extra thickness. Actually, it is recommended that the adjacent sheets be spaced slightly and may even be spaced up to ½ inch apart.

The clad furring strips of the present invention are preferably formed of a wood core which is a radiation-pervious material as far as X-rays or high-frequency radio waves are concerned. These clad furring strips are to be placed in a vertical position to cover the fasteners used to secure the lining to the wall. Also, the clad furring strips will cover the space between adjacent sheets of the lining.

A preferred form of the invention is illustrated in FIGS. 2, 3, 4, and 5. Referring first to FIG. 3, the core of the furring strips is indicated by the numeral 14 and is normally a radiation-pervious material such as wood. In this case the radiation-protective material is adapted to surround the core 14 on all four sides thereof. If, for example, the material is lead, then it initially will partially enclose the core 14 on three sides thereof. As shown in FIG. 3, this layer of material extends along one end 15 of the core 14, as shown at 16. The material is then bent to lie along the inner face 17 of the core, as shown at 18. The material is then bent and proceeds as shown at 19 to cover the opposite end 20 of the core. In this condition of the clad furring strip an ordinary nail 21 is driven through the core 14 and the inner layer 18 of the radiation-protective material, as well as through the lining 12 of the same material, and into the wall 10.

After the clad furring strip has thus been secured in place, the extension of the end 19 of the layer of material is then bent over to cover the outer face 22 of the clad furring strip, thereby forming the outer layer 23 of radiation-protective material, as shown in FIG. 4.

If the material is lead, this may be hammered over into place and no further fastening of the layer is necessary. FIG. 5 shows the clad furring strip of FIG. 4 with a decorative paneling secured thereto. The paneling, of course, extends along the wall over the clad furring strips previously secured thereto. The paneling is indicated by the numeral 24 and is shown in FIG. 5 as being secured to the clad furring strip by means of an ordinary nail 25. FIG. 5b illustrates the prescribed method of fastening the wall covering 24 to the clad furring strip 14 by staggering the furring strip fasteners 21 with the wall covering fasteners 25.

The radiation which will penetrate through the wall where nails are located will be stopped by the layer of material on the outer face of the strip, as shown at 23. The paneling 24 may then be secured to the strips but since the nails 25 must penetrate the outer layer 23, it is important that the nails terminate short of the inner layer 18. Since the radiations move in a straight path, it will be evident that they are attenuated by the outer layer 23 and they may not penetrate the paneling because the nails 25 do not pass through the inner layer and wall lining.

It will be apparent from the foregoing that the important aspect of the invention is the provision of the layers of radiation-protective material on the outer faces of the core or radiation-pervious material 14. With this in mind, FIGS. 6 and 7 illustrate a modification of the furring strip shown in FIGS. 3, 4 and 5. In these figures the same core 14 may be used but in this case the radiation-protective material extends only along the inner face of the core, as at 26, and then along one side thereof, as at 27. The strip may then be secured to the existing wall and lining in the manner shown in FIG. 3. After this, the layer 27 may be bent over, as at 28, to cover the outer face of the core 14. The desired wall covering may then be secured to the clad furring strip in the manner shown in FIG. 5.

FIGS. 8 and 9 illustrate a still further modified form of the invention wherein the radiation-protective layers of material are provided only on the inner and outer faces of the basic core 14. The inner layer is indicated by the numeral 29 in this instance and because it is not wrapped around the core, as in the first two forms, it is preferably secured to the inner face of the core 14 by a suitable adhesive 30. The clad furring strip may then be nailed to the wall in the manner heretofore described by the use of ordinary nails, such as 31. The outer face 22 of the core 14 may then have applied thereto the outer layer of radiation-protective material 32. This outer layer may then be secured to the core 14 by means of relatively short nails 33 to complete the clad furring strip and hold the outer layer in place while the decorative paneling 24 is applied thereto in the manner above described.

Figure 10:
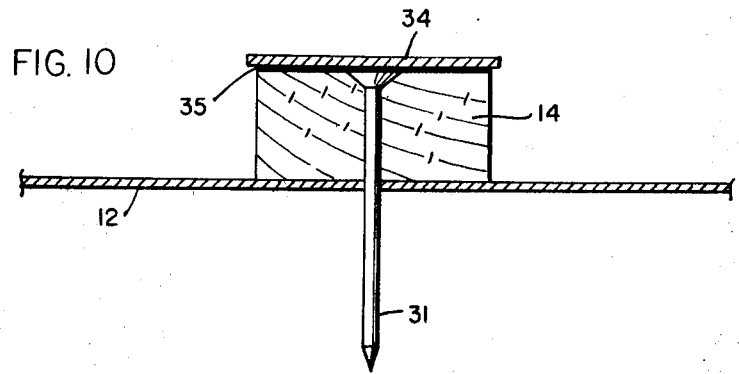
FIG. 10 is another form of a clad furring strip showing the outer layer fastened or bonded with mastic.

FIG. 10 illustrates a further modified form of the invention wherein the radiation-protective layer of material is provided only on the outer face of the basic core 14. The furring strip may be nailed to the wall in the manner heretofore described by the use of ordinary nails such as 31. The outer layer of radiation-protective material 34 may then be secured to the outer face 22 of the core 14 by means of relatively short nails or mastic 35 to complete the clad furring strip. The wall covering may then be applied thereto with nails or fasteners of a length which will not penetrate the wall lining 12 in the manner above described.

From the foregoing it will be evident that the invention provides a method of installing radiation-protective shielding which permits the use of conventional fasteners and wall covering without in any way impairing the radiation-protective character of the final construction.

The invention eliminates the need for laminating lead to paneling or plaster lath, the need for using lead-headed nails, lead plugs, or lead stripping and mouldings. It permits using all standard wall covering materials, such as paneling, plaster lath sheeting, or plywood.

This invention greatly reduces the time and labor involved. It dispenses with the need for exact measuring of the walls before installation and eliminates the need for factory-cut lead laminated paneling. It eliminates the need for counterboring for lead nails. It eliminates the need for lead burning, and the need for the lead laminated finishing mouldings.

Also, the clad furring permits installation of conventional wall covering in the usual manner. Therefore, anyone who usually installs conventional wall coverings could install this radiation shielding.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A clad furring strip adapted to be secured to a wall having a radiation-protective layer thereon, and adapted to have secured thereto conventional wall covering, said clad furring strip comprising,
    (a) a support strip of radiation-pervious material, and
    (b) a strip of radiation-protective material on at least the surface of said support strip which is opposite the surface thereof facing the radiation protective layer to which the furring strip is adapted to be secured.

2. A clad furring strip as defined in claim 1, wherein said radiation-protective material on said support strip is lead.

3. A clad furring strip as defined in claim 1, wherein said radiation-impervious material on said support strip is copper wire mesh.

4. A radiation-protective wall construction comprising,
    (a) a supporting surface including a layer of radiation-protective material,
    (b) a plurality of clad furring strips secured to said layer, each said clad furring strip including
        (1) a support strip of radiation-pervious material,
        (2) a strip of radiation-protective material on the face of said support strip adjacent said layer, and
        (3) a strip of radiation-protective material on the face of said support strip opposite the face thereof which is adjacent said layer,
    (c) fasteners extending through each said support strip and said first named radiation-protective strip and through said layer, and
    (d) means for securing said second named radiation-protective strip to said support strip,
    (e) said second named radiation-protective strip covering said fasteners.

5. A wall construction as defined in claim 4, wherein said means for securing said second named radiation-protective strip to said support strip includes fasteners extending through said second named radiation-protective strip and into said support strip, and terminating short of said first named radiation-protective strip.

6. The combination of elements defined in claim 4, wherein said radiation-protective strips are lead.

7. The combination of elements defined in claim 4, wherein said radiation-protective strips are copper wire mesh.

8. A wall construction as defined in claim 5, combined with a decorative paneling mounted on said clad furring strips.

9. A wall construction as defined in claim 5, combined with a decorative paneling mounted on said clad furring strips and secured thereto by said last named fasteners.

10. A radiation protective wall construction comprising
    (a) a supporting surface including a layer of radiation protective material,
    (b) a plurality of clad furring strips secured to said layer, each said clad furring strip including
        (1) a support strip of radiation-pervious material
        (2) a strip of radiation-protective material on said support strip and covering at least the face thereof opposite the one adjacent to said layer, and
    (c) fasteners extending through each said support strip and through said layer, and
    (d) means for securing said strip of radiation-protective material to said support strip,
    (e) said strip of radiation protective material covering said fasteners.

References Cited
UNITED STATES PATENTS

| | | | |
|---|---|---|---|
| 1,780,108 | 10/1930 | Barry | 109—84 |
| 1,815,922 | 7/1931 | Lapof. | |
| 2,183,790 | 12/1939 | Dillehay. | |
| 2,875,101 | 2/1959 | Erlich | 52—515 |
| 3,134,020 | 5/1964 | Shoenfeld. | |

REINALDO P. MACHADO, Primary Examiner

U.S. Cl. X.R.

52—515; 250—108